United States Patent

Tokunaga

[15] 3,642,226

[45] Feb. 15, 1972

[54] AUTOMATIC STOP DEVICE FOR A MAGNETIC TAPE RECORDER

[72] Inventor: Kenki Tokunaga, Ora-gun, Japan

[73] Assignees: Sanyo Electric Co., Ltd., Moriguchi-shi; Tokyo Sanyo Electric Co., Ltd., Ora-gun, Japan

[22] Filed: Nov. 18, 1969

[21] Appl. No.: 877,779

[30] Foreign Application Priority Data

Nov. 20, 1968 Japan....................................43/85453
May 13, 1969 Japan....................................44/36817

[52] U.S. Cl...............................242/191, 200/61.17, 242/57, 307/120

[51] Int. Cl.....................................B65h 25/32, G11b 15/46

[58] Field of Search..................242/191, 190, 189, 187, 186, 242/57; 200/61.17, 61.46; 307/120

[56] References Cited

UNITED STATES PATENTS 3,488,017 1/1970 Schatteman............................242/191

*Primary Examiner*—George F. Mautz
*Attorney*—Darby & Darby

[57] ABSTRACT

An automatic stop device for a magnetic tape recorder (or reproducer), wherein the end of feed of a tape is assuredly detected by a unique detecting circuit utilizing a simple current interrupter and the detected signal is amplified through a simple transistor circuit to a level sufficiently high to assuredly operate a magnetic plunger which actuates the stop mechanism.

10 Claims, 5 Drawing Figures

INVENTOR
KENKI TOKUNAGA

BY Darby & Darby

ATTORNEYS

INVENTOR
KENKI TOKUNAGA

BY Darby & Darby
ATTORNEYS

AUTOMATIC STOP DEVICE FOR A MAGNETIC TAPE RECORDER

BACKGROUND OF THE INVENTION

1. FIELD OF THE INVENTION

This invention relates to a magnetic tape recorder which records (reproduces) information like an aural signal onto (from) a magnetic tape stretched on a takeup reel and a supply reel, and more particularly to an improved automatic stop unit which stops a tape driving mechanism when a magnetic tape is reeled off.

2. DESCRIPTION OF THE PRIOR ART

In a high-quality magnetic tape recorder, it is desirable to have an automatic device which makes it possible to change a tape immediately after a tape is reeled from one reel to another, prevents the deformation of a friction conductor for a tape driver and prevents the unnecessary consumption of electricity. In a widely used capstan drive magnetic tape recorder, the tension applied to the tape is completely removed by taking off a pinch roller which presses the tape onto the capstan and releasing at least a part of the friction conductor of a mechanism which takes out the rotation of a motor to a spindle of a reel. Namely, the tape drive mechanism is released. In the special case of a magazine-type magnetic tape recorder which reads a tape installed into a magazine, the tape magazine may be ejected at the same time as the tape drive mechanism is released.

The automatic stop unit which releases said tape drive mechanism must comprise an electromagnetic plunger means for obtaining the necessary mechanical drive power, electric drive means for energizing said plunger means and means for detecting the time when the tape is reeled off and operating said drive means at a suitable time.

Though many such automatic stop units as described above are known, they suffer from the disadvantages such as complexity of structure, low reliability, high production cost, difficulty of mass production, etc. More specifically, in prior units when the electromagnetic plunger means is directly energized by a semiconductor control unit having three electrodes, like a transistor, a power amplifying stage composed of one or plurality of semiconductor control elements is connected to an electronic flip-flop circuit composed of a plurality of said semiconductor control elements and the electromagnetic plunger means is connected to the power amplifying stage. Thus, the circuit structure becomes quite complex and the cost high, whereas the reliability of performance is often unsatisfactory. Further, the prior art detecting means include various devices such as one which detects the change of the tape tension when the tape is reeled off, one which electrically detects an end mark made of a conductive film, etc., placed at the end of the tape, and so forth. The defects of these methods are well known to those skilled in the art. Namely, in the magazine-type magnetic tape recorder, it is difficult to detect the end of the rapid winding and rewinding. It is also undesirable to apply a frictional load to a tape at all times. The latter fact is particularly disadvantageous because the tape becomes quite expensive, and the end of tape may be detected only for a special tape. Recently, a system in which the end of tape is detected by sensing the stoppage of the rotation of the spindle of either a takeup or supply reel was invented in order to obviate the deficiencies described above. However, this system is also unsatisfactory in its reliability and ease of mass production.

SUMMARY OF THE INVENTION

Accordingly, a primary object of this invention is to provide an automatic stop unit which is simple in structure, reliable, suitable for mass production, yet small in size and light in weight.

Another object of this invention is to provide an electronic drive circuit which can accurately energize an electromagnetic plunger means by using only two semiconductor control elements, having one input electrode and two output electrodes like a transistor.

A further object of this invention is to provide a drive circuit as described above in which the performance of the circuit is not influenced by the change of parameters of said semiconductor control elements or the change of the potential of the power supply and temperature and thus the adjustment of the circuit is not necessary.

A yet further object of the invention is to provide a detecting means for detecting the end of the tape, in which the end of the tape is detected only by sensing the stoppage of rotation of a spindle of a reel without any contact with a tape, and a make-and-break contact, without using a transfer contact, is sufficient for the switch element associated with said spindle.

A yet further object of this invention is to provide means for detecting the end of the tape as described above, in which the detection delay time is not changed by the stop state of said make-and-break switching element.

In order to obviate the deficiencies described hereinabove and achieve said objects, the automatic stop unit for a magnetic tape recorder according to this invention comprises an electromagnetic plunger means for obtaining a mechanical driving force necessary to release a tape drive mechanism, means for detecting the end of the tape which produces an electrical signal when it detects that the tape is reeled off from one reel to another, and a drive circuit which is operated by said signal and energizes said electromagnetic plunger means, wherein said drive circuit consists of two semiconductor control elements of opposite conductivity type, each having an input electrode and two output electrodes, one of said output electrodes of said semiconductor control element at the first stage and the input electrode of said semiconductor control element at the second stage are connected in a way that the latter element provides almost all loads for the former element, a positive feedback circuit from said latter semiconductor control element to the former element is provided and said electromagnetic plunger means is connected to one of the output electrodes of said latter semiconductor control element.

Other objects, features and advantages of this invention will become more apparent from the following detailed description of the invention when taken in conjunction with the accompanying drawings.

Figure 1:
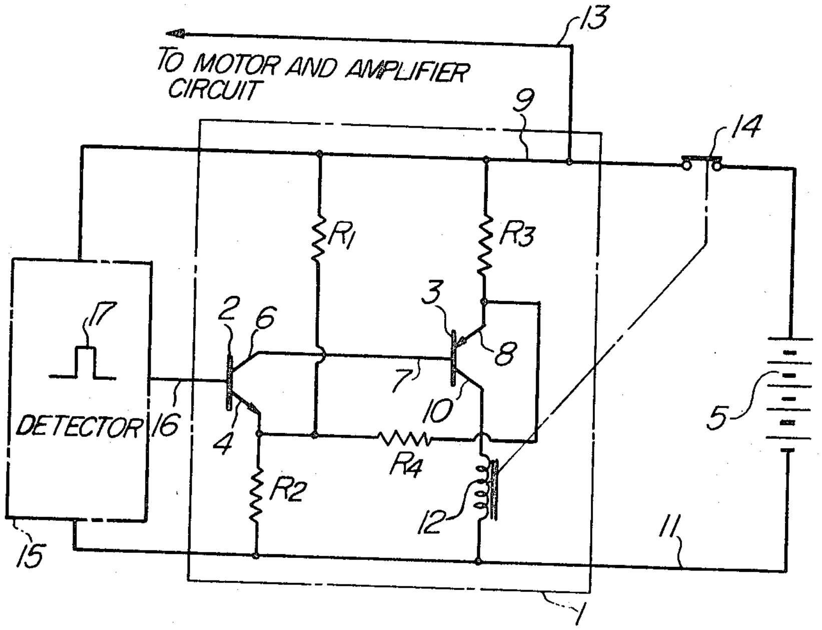
FIG. 1 is an electric circuit diagram of a drive circuit according to this invention.

DESCRIPTION OF THE PREFERRED EMBODIMENTS:

Referring to FIG. 1, the drive circuit 1 according to this invention comprises two semiconductor control elements of opposite conductivity type, each having one input electrode and two output electrodes, for example an NPN-type transistor 2 at a first stage and a PNP-type transistor 3 at a second stage. One of the output electrodes, an emitter electrode 4, of the first transistor 2 is connected to a voltage divider consisting of resistors $R_1$ and $R_2$ and the divided voltage of a DC power supply 5 is applied thereto as a bias voltage. The other output electrode, collector electrode 6, is connected to an input electrode of the transistor 3 at the second stage, the base electrode 7, so that all the input current to said transistor 3 or all the base current works as an output load current or a collector load current from the collector 6 of said transistor 2 at the first stage. In some cases, however, it is desirable to insert a very small resistance between the collector electrode 6 and the base electrode 7 for preventing oscillation of the circuit and insert a large resistance between the base electrode 7 of the second transistor 3 and the positive potential feed line 9 for preventing thermal runaway. One of the output electrodes of the second transistor 3, the emitter electrode 8, is connected to the positive potential feed line 9 through the resistor $R_3$ and to the emitter electrode 4 through the resistor $R_4$ to positively feedback the potential drop at the resistor $R_3$ to the emitter 4 of the first transistor 2. An electromagnetic plunger means 12 is connected between the other output electrode of transistor 3 the collector electrode 10, and the negative potential feed line 11. There is also provided, between the junction of the feed line 9 and the feed line 13 for the amplifier circuit and the motor circuit of the magnetic tape recorder, and the positive terminal of the DC power supply 5, a power switch 14 which is interlinked directly or indirectly to the electromagnetic plunger means 12. The tape playing is started upon closing of the power switch 14 by lever operation or pushbutton operation, or in a player adapted to magazine-contained tapes, by the insertion of a tape magazine. When the tape is reeled off from one reel to the other and the performance ends, a stop signal 17 is produced by the means 15 for detecting the end of the tape. This is applied to the input or base electrode 16 of the first transistor 2 connected to said detecting means 15 and the transistor 2 turns on. Conduction of the first transistor 2 produces a signal to cause the second transistor 3 to become conductive and the electromagnetic plunger means 12 is energized. The transistors 2 and 3 are turned on quite rapidly because all the base current of the second transistor 3 is controlled in the form of the collector load current of the first transistor 2 and the positive feedback is applied through the resistor $R_4$. A large current, unachievable by the prior art circuits consisting of two transistors, flows through the collector electrode 10 of the second transistor 3 and the plunger means 12 will operate quite accurately even under a large mechanical load. As a result of the operation of the plunger means 12, the so-called "trigger" of the mechanism which maintains the tape drive mechanism at the operating state, for example, against the repulsive force of a spring, is unlatched thereby to release said tape drive mechanism, and concurrently the power switch 14 is opened to cut off the power supply to all the circuits except a stop indicator lamp if such a lamp is used. When the device is stopped only for changing the tape or the tape magazine and the stop time is short, the motor circuit may not be opened depending on the operation of the electromagnetic plunger means on account of the rise time of the motor and said motor may continue rotating.

Figure 2:
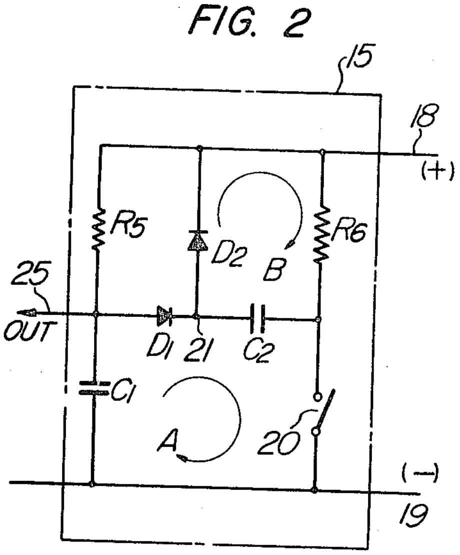
FIG. 2 is an electric circuit diagram of a means for detecting the end of the tape according to this invention.
Figure 3:
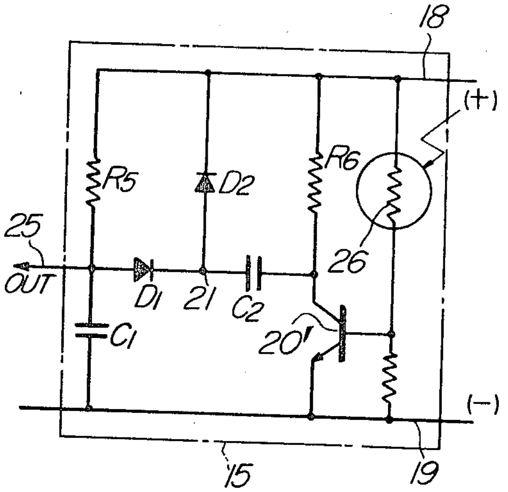
FIG. 3 is an electric circuit diagram of a means for detecting the end of the tape when the contact of the make-and-break switching circuit is made unnecessary by employing a photoelectric conversion element.

The means 15 for detecting the end of reel shown by the block in FIG. 1 is shown in detail in FIGS. 2 and 3. In FIG. 2, a time constant circuit consisting of the resistor $R_5$ and a first capacitor $C_1$ and a series circuit consisting of the resistor $R_6$ and the switching element 20 are connected in parallel between the positive potential feed line 18 and the negative potential feed line 19. A series circuit consisting of a first diode $D_1$ and a second capacitor $C_2$ is provided between the time constant circuit $R_5C_1$ and said series circuit $R_6$20 and a second diode $D_2$ is connected between the junction point 21 where said first diode $D_1$ and said second capacitor $C_2$ meet and said positive potential feed line 18 on the side which reversely biases said first diode $D_1$. The loop A consisting of said first capacitor $C_1$, said first diode $D_1$, said second capacitor $C_2$ and said switching element 20 forms a discharge circuit for the first capacitor $C_1$. The loop B consisting of said second capacitor $C_2$, said second diode $D_2$ and the resistor $R_6$ forms a discharge circuit for said second capacitor $C_2$.

Figure 4:
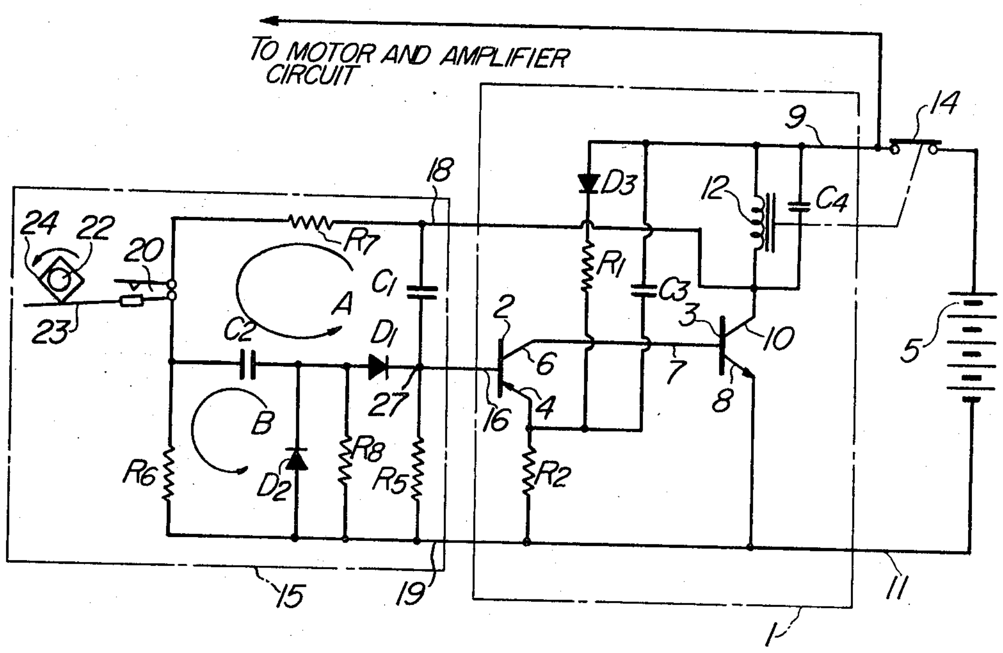
FIG. 4 is an electric circuit diagram showing the most preferred and detailed embodiment of this invention.

As is evident from FIG. 4, the armature 23 of said switching element 20 is coupled to a cam plate 24 axially attached to the spindle 22 which drives the reel when the tape runs so that the switching element is responsive to the rotation of said spindle 22 and performs quick switching operation. When said switching element 20 is open, the first capacitor $C_1$ is charged through the resistor $R_5$. In this case, charging of said first and second capacitors $C_1$ and $C_2$ through said resistor $R_6$ is prevented by said first diode $D_1$. When said switching element 20 is closed, a part of the charge (half of the total charge when said first and second capacitors $C_1$ and $C_2$ have the same capacitance) charged in said first capacitor $C_1$ discharges through the loop A. The charge is thus transferred to said second capacitor $C_2$ and the potential at the first capacitor $C_1$ is lowered. Charging of said second capacitor $C_2$ through a part of said loop B is prevented by said second diode $D_2$. When said switching element is opened again, said first capacitor $C_1$ begins to be charged through said resistor $R_5$ and the charge transferred to said second capacitor $C_2$ discharges through said loop B. The second capacitor is thus ready to receive the next charge from said first capacitor $C_1$.

Figure 5:
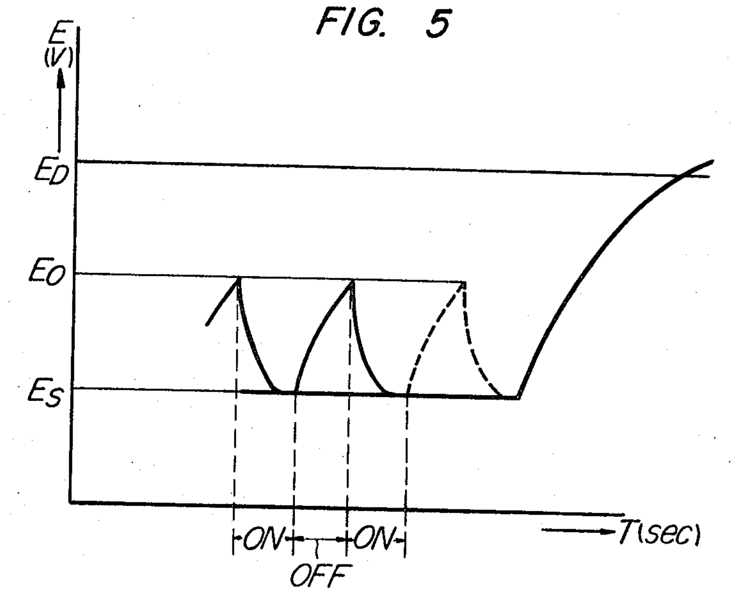
FIG. 5 is a characteristic diagram showing the variation of the charging voltage of a first capacitor for explaining the principle of operation of the means for detecting the end of the tape according to this invention.

The change of charging potential of said first capacitor when the tape runs is shown in FIG. 5. While the tape is running, said first capacitor $C_1$ periodically discharges a part of the charge. The charging potential rises and falls between $E_S$ and $E_O$ and never rises above the potential value $E_D$ of the detection level.

When all the tape is reeled off from one reel to another, each spindle of the reel stops while the tape is stretched between the two reels if the end of said tape is attached to the supply reel. If the end of said tape is not attached to the supply reel, the tape is removed from the reel and the spindle on the supply side stops. Thus, the switching operation of said switching element 20 stops. When the spindle stops in the state where the switch 20 is open, the potential of only the first capacitor $C_1$ rises. When the spindle stops while the switch 20 is closed, the potentials of both the first and second capacitors $C_1$ and $C_2$ rise. Namely, when the tape is reeled off, the potential of the first capacitor $C_1$ rises and reaches the detection level $E_D$ as shown in FIG. 5 irrespective of the stop state of said switching element 20. The potential above the detection level $E_D$ is taken out from the output line 25 and the end of the tape is detected.

The circuit for the detecting means according to this invention is composed so that said switching element 20 performs only a make-and-break operation but not a transfer operation as described hereinabove and therefore, said switching element 20 can be replaced by a contactless switch without difficulty. In FIG. 3, the emitter and collector electrodes of the transistor 20′ are used instead of said switching element 20 and a photoelectric conversion (light dependent) resistor element 26 is connected to the base bias circuit of said transistor 20′. Said photoelectric conversion resistor element 26 is periodically irradiated by the light from the light source by a known method in coincidence with the rotation of said spindle. The transistor 20′ thus performs a switching operation corresponding to said switching element 20 shown in FIG. 2.

FIG. 4 shows the most preferred and detailed embodiment of this invention when said drive circuit and said means for detecting the end of the tape are combined. Said drive circuit 1 shown in FIG. 4 differs from the one shown in FIG. 1 in that both the transistors 2 and 3 are replaced by the ones of opposite conductivity type. A nonlinear element $D_3$ having a constant potential characteristic like a silicon diode is inserted into one arm of a potential divider $D_3R_1$ for the emitter of transistor 2 giving an emitter bias to the transistor at the first stage. A capacitor $C_3$ is connected in parallel to the one arm of said potential divider $D_3R_1$. The positive potential feed line 18 of the means 15 for detecting the end of the tape is connected to the collector electrode 10 of the transistor 3 at the second stage to positively feedback the potential drop across the electromagnetic plunger means 12 connected to said collector electrode 10 to the base electrode 16 of said first transistor 2 through said first capacitor $C_1$. A capacitor $C_4$ is connected in parallel to said electromagnetic plunger means 12 and the emitter electrode 8 of said second transistor 3 is coupled directly to the negative potential feed line 11. Transistors of opposite conductivity type to those described above in connection with FIG. 1 are used because it is easier to obtain an NPN-type transistor for large current use than a PNP-type transistor. The nonlinear element $D_3$ inserted into the potential divider for the emitter 4 plays an important role for preventing the erroneous operation due to the variation of the power source potential. This function is particularly effective when the device of this invention is installed into a magnetic tape recorder for car use and a car battery is used as the power supply. For, even if the potential of the battery is considerably lowered when the engine is started, the lowering of the emitter potential of said first transistor 2 is prevented by the constant voltage provided by the nonlinear element $D_3$. Thus, the first transistor is prevented from being erroneously turned on. It is to be noted here that the emitter bias voltage of said first transistor 2 is not strictly constant, but depends somewhat on the change of the power source potential on account of the presence of the potential divider consisting of the resistors $R_1$ and $R_2$. This fact is important when the influence of the change in the power source potential on the delay time of detection by the time constant circuit is attempted to be reduced or eliminated. Since the time constant circuit is connected to the base electrode of the first transistor 2 and the level of the charging potential of the first capacitor $C_1$ of said time constant circuit is compared with the emitter potential of said transistor, changes in the power supply potential could produce unwanted changes in voltage at the emitter 4. The capacitor $C_3$ connected in parallel to the one arm $D_3R_1$ of the potential divider delays the drop of the emitter potential due to the emitter current when said first transistor 2 is activated. This helps the positive feedback effect between collector 10 of the transistor 3 and base 16 of transistor 2 through; the first capacitor $C_1$ and is effective for releasing said positive feedback effect in a short time and making the electromagnetic drive circuit 1 recover to a cutoff state. Further, the structure in which said first capacitor $C_1$ is utilized for positive feedback is quite important for eliminating the influence of the variation of the power source potential and the atmospheric temperature and the influence of the change of parameters of the transistors 2 and 3 on the performance of the drive circuit 1 and making adjustments to the circuit unnecessary. Namely, since the feedback by capacitors has an advantage over feedback by resistors in that the charging or discharge current of the capacitor itself works as a feedback current, a larger feedback current is obtained and the rise time thereof is quite short. Thus, there is obtained quite a rapid switching characteristic which can completely eliminate the effect of the various conditions on the reaction of the drive circuit 1. This is important for the drive circuit 1 of this invention whose primary object is to produce a large current instantaneously. The capacitor $C_4$ has another effect to protect the transistors 2 and 3 from the excess transient voltage when the power source switch 14 is opened and prevents erroneous operation when the switch 14 is rapidly closed. When the power source switch 14 is rapidly closed, the electromagnetic plunger means 12 transiently exhibits an infinite impedance and the base potential of the first transistor 2 is forced to a negative value. In some cases, said transistor 2 is turned on erroneously. However, if the capacitor $C_4$ is connected in parallel to the electromagnetic plunger means 12, the electromagnetic plunger means is transiently short circuited and the erroneous operation is completely prevented.

The means 15 for detecting the end of the tape shown in FIG. 4 differs from the one shown in FIG. 2 in that the first and second diodes $D_1$ and $D_2$ are placed in opposite directions corresponding to the conductivity type of the first transistor 2 of the drive circuit, the resistor $R_7$ for inhibiting a discharge current is provided in the loop A and the resistor $R_8$ is connected in parallel to the second diode $D_2$. The resistor $R_8$ is effective for removing the influence of the stop state of the switching element 20 on the detection delay time of said means 15 for detecting the end of the tape or the time required for the charging potential of said first capacitor $C_1$ to reach the detection level $E_D$ after the spindle 22 stops. In the device shown in FIG. 2, the first and second capacitors $C_1$ and $C_2$ are connected in parallel when the device stops in the state that the switching element 20 is closed. Thus, the detection delay time is doubled (when the first and second capacitors $C_1$, $C_2$ have the same capacitance) compared with the case where the device stops while the switch is open. However, said detection delay time can be made the same in the device shown in FIG. 4 by making the time constant of the series circuit consisting of the second capacitor $C_2$ and the resistor $R_8$ smaller than the time constant of the series circuit consisting of the first capacitor $C_1$ and the resistor $R_5$. Namely, when the device stops while the switching element 20 is closed, charging of said second capacitor $C_2$ always precedes the charging of the first capacitor $C_1$ due to said difference in time constants. Thus the first diode $D_1$ is cut off in a reversely biased state and the delay time is always determined by the time constant of the first capacitor $C_1$ and said resistor $R_5$ irrespective of whether the switching element 20 is open or closed. When the suppressor resistor $R_7$ is inserted into the loop A, the detection delay time changes slightly depending on the time required for discharging a part of the charges in the first capacitor $C_1$ to said second capacitor $C_2$ until the potential level becomes the same, but the difference is negligible in practice.

The drive circuit 1 and the means 15 for detecting the end of the tape are connected by connecting the positive potential feed line 18 of said means 15 to the collector electrode 10 of the second transistor 3, connecting the negative potential feed line 19 to the negative potential feed line 11 and connecting the connection point 27 of the first capacitor $C_1$ and the resistor $R_5$ to the base electrode 16 of said first transistor 2. The circuit constants actually employed for a design of the automatic stop unit according to this invention will be presented hereinbelow.

| | | |
|---|---|---|
| first transistor 2 | 2SB187 | $h_{FE}$50 ~ 200 |
| second transistor 3 | 2SC932 | $h_{FE}$50 ~ 200 |
| $R_1$ | 220 Ω | |
| $R_2$ | 560 Ω | |
| $R_5$ | 100 kΩ | |
| $R_6$ | 1 kΩ | |
| $R_7$ | 22 Ω | |
| $R_8$ | 56 kΩ | |
| $C_1$ | 100 μf | |
| $C_2$ | 100 μf | |
| $C_3$ | 100 μf | |
| $C_4$ | 100 μf | |
| $D_1$ | 1s188 | |
| $D_2$ | 1S188 | |
| $D_3$ | DS410 | |
| electromagnetic plunger means 12 | | 13 v.×2 a. |
| DC power supply 5 | | 13 v. |

It is verified by experiment that the electromagnetic plunger means 12 having a much larger power handling capacity e.g., 13 v.×5 a., can also be driven safely in said circuit composition.

As has become evident from the foregoing detailed description, the automatic stop unit according to this invention has the following two outstanding features. The first feature relates to the drive circuit 1. Namely, two semiconductor control elements of opposite conductivity type are used, the semiconductor control element at the latter stage is controlled as an almost full load of the semiconductor control element at the former stage and a positive feedback circuit is provided. The other features is concerned with the means 15 for detecting the end of the tape. Namely, the switching element 20 coupled with the rotation of the spindle of the tape reel is composed so as to perform only a make-and-break operation but not a transfer operation. In a composition wherein a transfer switch must be used in lieu of said switching element 20, a contact fault of the armature is inevitable due to the wear of the rotating contact and the stationary contacts and thus the performance of the switch becomes unreliable. Further, fine adjustment of the position of said contacts is necessary (it is necessary to adjust the gap between said rotating contact and said stationary contacts to be 0.2 mm. when the switch is open). Said contacts are usually made of wire springs, but the fine adjustment of springs is usually difficult and quite unsuitable for mass production. In the means 15 for detecting the end of the tape according to this invention, however, the switching element 20 performs only a make-and-break operation and the probability of contact fault is remarkably reduced compared with the switch having three contacts. Thus, the device of this invention has the advantages that its reliability is enhanced, it is suitable for mass production because no great accuracy of the gap length between the contacts is required and the switching element 20 may easily be replaced by a semiconductor switching element as shown in FIG. 3.

The automatic stop unit according to this invention is not limited to a type which records and reproduces information, but may be applied to a type for reproduction only. Thus, the magnetic tape recorder of this invention includes a reproducer. Also, the switching element 20 is not limited to a mechanical switch but an electronic switch may also be employed.

I claim:

1. In a magnetic tape recorder having first and second means between which said tape is reeled and unreeled, tape drive means for operating said first and second means, automatic means for disabling said tape drive means comprising electromagnetically operated means for selectively controlling the operation of said drive means, means for sensing when the tape has been unreeled between said first and second means, and for producing a signal representative thereof, a drive circuit responsive to said signal and for operating said electromagnetic means, said drive circuit including a first semiconductor control element and a second semiconductor control element each having an input electrode and two output electrodes, said signal being applied to the input electrode of said first semiconductor control element, means connecting one of said output electrodes of said first semiconductor control element and said input electrode of said second semiconductor so that said second semiconductor control element provides a substantial portion of the output load for said first semiconductor control element, means for providing positive feedback circuit from said second semiconductor control element to said first semiconductor control element, and means connecting said electromagnetic means to one of said output electrodes of said second semiconductor control element.

2. Apparatus as in claim 1, wherein said first semiconductor control element and said second semiconductor control element are respective first and second transistors each having a base electrode, an emitter electrode and a collector electrode respectively, one of said transistors being of the NPN type and the other of the PNP type, means for connecting the collector electrode of said first transistor to the base electrode of said second transistor so that the collector current of said first transistor substantially equals the base current of the second transistor, said signal being applied to the base electrode of said first transistor, and said electromagnetic means being connected to the collector electrode of said second transistor.

3. In a magnetic tape recorder having first and second means between which said tape is reeled and unreeled, tape drive means for operating said first and second means, automatic means for disabling said tape drive means comprising electromagnetically operated means for selectively controlling the operation of said drive means, means for sensing when the tape has been unreeled between said first and second means, and for producing a signal representative thereof, a drive circuit responsive to said signal and for operating said electromagnetic means, said sensing means which produces said signal comprising circuit means including a time constant circuit having a first capacitor, a series circuit including a resistor and a make and break switching element operated by said drive means, a power supply means, means connecting said time constant circuit and said series circuit in parallel to said power supply means, a first unilateral conducting element and a second capacitor connected in series between said time constant circuit and said series circuit, the loop comprising said first capacitor, said first unilateral conducting element, said second capacitor and said switching element forming a discharge loop for said first capacitor when said switching element is closed, a point on said loop between said first unilateral conducting element and said second capacitor connected through said second unilateral element to said power supply, the loop comprising said second capacitor, said second unilateral conducting element and said resistor forming a discharge loop for said second capacitor when said switching element is opened thereby to increase the charging potential of said first capacitor when said switching element stops its on and off operations, said increase of potential being said signal produced by the circuit.

4. Apparatus according to claim 3, further comprising a resistor for suppressing the discharge current of the said first capacitor inserted in said discharge loop of said first capacitor.

5. Apparatus according to claim 3, wherein said switching element comprises a semiconductor switching element which performs a make-and-break operation by photoelectric conversion.

6. Apparatus as in claim 3, wherein a second resistor is connected in parallel to said second unilateral conducting element, the time constant for discharging said second capacitor comprising said second resistor and said second capacitor is smaller than the time constant circuit in which said first capacitor is located whereby said first unilateral conducting element is backwardly biased when said switching element is closed.

7. Apparatus according to claim 3, wherein said drive circuit comprises a first transistor and a second transistor of opposite conductivity types each having a base electrode, an emitter electrode and a collector electrode, said collector electrode of said first transistor being connected to the base electrode of said second transistor so that said second transistor constitutes a large portion of the load for said first transistor, power supply means, a potential divider comprising at least two series-connected resistors connected across said power supply, means for connecting the emitter electrode of said first transistor to said potential divider, said electromagnetic means being connected to the collector electrode of said second transistor, one terminal of said first capacitor being connected to the base electrode of said first transistor and the terminal of said capacitor being connected to the collector electrode of said second transistor, the potential drop across said plunger means being fed back through said first capacitor to said base electrode of said first transistor.

8. Apparatus according to claim 7, further comprising a capacitor connected in parallel to said electromagnetic means.

9. Apparatus according to claim 7, further comprising a nonlinear element having a constant voltage characteristic connected in one arm of said potential divider.

10. Apparatus according to claim 7, further comprising a capacitor connected parallel to one arm of said potential divider.

* * * * *